Oct. 23, 1962 W. G. WADEY 3,059,842

CARD PUNCH

Filed Sept. 6, 1960

2 Sheets-Sheet 1

INVENTOR

WALTER G. WADEY

BY B. F. Griffin Jr.

ATTORNEY

Oct. 23, 1962 W. G. WADEY 3,059,842

CARD PUNCH

Filed Sept. 6, 1960 2 Sheets-Sheet 2

INVENTOR

WALTER G. WADEY

BY B. F. Griffin Jr.

ATTORNEY

United States Patent Office 3,059,842

Patented Oct. 23, 1962

3,059,842

CARD PUNCH

Walter G. Wadey, Wynnewood, Pa., assignor to Sperry Rand Corporation, New York, N.Y., a corporation of Delaware Filed Sept. 6, 1960, Ser. No. 54,086
19 Claims. (Cl. 234—50)

The present invention relates to selective punching devices and more particularly to selective punching devices such as those used in data processing systems. The present invention provides a selective punching device wherein fluid-actuated punches perform the punching operation upon a record medium while the medium is in motion.

As is well known to those familiar with data processing devices, data may be recorded or stored as a combination of holes punched in a card, tape or other record medium. Although the present invention is admirably suited for use in a card punching apparatus, and will be described in a card punch environment, it is obvious that it may be used to great advantage in devices for punching tapes or other media.

In one arrangement of the prior art the card is considered as being divided into a plurality of vertical columns and horizontal rows, one vertical column for each data character to be recorded, and one horizontal row for each element of the code being employed. For example, to record 90 decimal characters the card has 90 vertical columns and 10 horizontal rows.

In one card punch device of the prior art, the card in which information is to be punched is fed through a punching station one row at a time. Punches aligned in a single row across the card feed path are selectively actuated to punch holes in the desired row after which the card is moved to the next successive row and the operation is repeated. Since the punches move only in a direction normal to the plane in which the card moves, this system requires that the card be stopped during the punching of each row. The excessive number of stopping operations required in this system creates a problem of wear in the card feeding mechanism and more importantly reduces the number of cards which may be punched within a given time interval.

Therefore, an object of the present invention is to provide a card punch device which may selectively punch holes in a card while the card is in motion thus materially reducing wear on the card feeding mechanism and at the same time increasing the number of cards which may be punched within a given time interval. This is accomplished through the use of punches arranged in a plurality of parallel rows within the interior of a continuously rotating drum, said punches when actuated extending beyond the periphery of the drum so that they may pass through the card and into a die which rotates in synchronism with the punch drum.

A second card punch device of the prior art reduces the number of required stopping operations by providing one punch for each possible punching position. Thus, for a system operating in the decimal code and having 90 columns, 900 punches are provided. The card is moved into the punching station and stopped. The punches are selectively actuated to punch all desired holes simultaneous after which the card is fed out and a new card fed into the punching station. This arrangement has the advantage of requiring only one stop-start operation per card. However, it has a disadvantage in that it increases wear on the punch drive mechanism common to all punches since all selected punches must be driven through the card simultaneously. In addition, the force created by driving all selected punches through the card simultaneously tends to bow the punch die. Thus, to insure that all selected punches will pass through the card, the punch drive mechanism must be adjusted for the maximum load. This results in the punches being driven too far into the die under minimum load conditions, thus increasing wear on both the punches and the die.

Therefore, a further object of this invention is to provide a card punch device having a punch for each possible punching position in the card, said punches being selectively actuated row by row to reduce wear on the punches and die.

A further object of the invention is to provide a punch device which does not require mechanical linkages to operate the punches.

Card punch devices of the prior art utilize either electrical signals or fluid pressure signals to operate mechanical linkages which in turn extend and retract the punches.

A further object of this invention is to provide a card punch device wherein fluid pressure signals act directly upon the punches thus eliminating the intervening mechanical linkages and reducing the number of parts subject to wear.

Another object of this invention is to provide a punch, one portion of said punch having the configuration of a cylinder in which it is free to oscillate, and means for applying fluid pressure to said punch to cause it to oscillate.

Another object of the present invention is to provide a punch, one portion of said punch having the configuration of a cylinder in which it is contained, means to apply fluid pressure to said cylinder to extend said punch into punching position, and resilient means for retracting said punch.

Other and further objects of the invention will become apparent upon reading the following specification taken together with the accompanying drawings in which.

Figure 1:
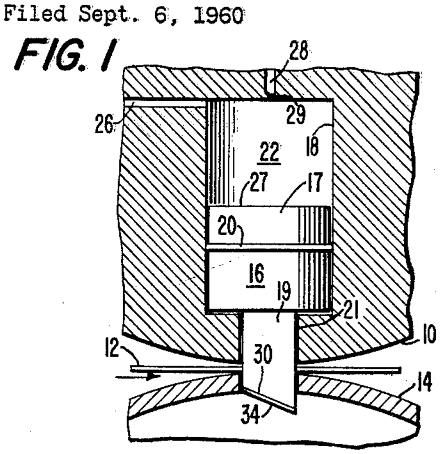
FIGURE 1 is a first embodiment of a free moving fluid-actuated punch in accordance with the present invention.

FIGURE 1 shows a continuously rotating punch drum 10 which rotates in a counterclockwise direction in synchronism with the rate of movement of a card 12. A die drum 14 rotates in a clockwise direction and is synchronized with the movement of the punch drum so that the hole in the die drum is in proper alignment to receive the punch 16.

The punch 16 is basically a single-acting piston reciprocating within an accurately machined double-ported cylinder 18. The punch has an upper portion 17 formed to act as a piston in cylinder 18 and an elongated lower portion 19 closely machined to the dimensions of the channel 21. The elongated portion of the punch terminates at punching surface 30. A fluid seal such as elastomer O-ring 20 is provided to prevent fluid leakage from the enclosed space 22 radially outward through the space between the punch piston and the cylinder wall. It will be understood by those skilled in the art that FIGURE 1 is drawn in exaggerated proportions for the sake of clarity and that in actual practice this space is much smaller than shown.

In its retracted position, the punch 16 is withdrawn into the space 22 so that the punching surface 30 rests within channel 21 and does not extend beyond the periphery of the drum 10. In order to punch a hole in the card 12 a control signal in the form of increased fluid pressure is applied over a first control duct 26 to the confined space 22. The increased pressure within the confined space 22 acts upon the surface 27 of the piston to drive the punch radially outward through the card and into the hole within the die drum 14. As the extended punch passes through the card it removes the card chip 34. The control signal may be applied to the duct 26 as the punch 16 rotates into punching position or slightly before this time, depending upon the rate of movement of the card 12. The control signal is maintained long enough for the punch to roll in and out of the card after which the control signal is removed from duct 26. Duct 28 is connected by suitable means( not shown) to the low pressure side of the fluid supply system and because of the restricted opening 29 allows the fluid within space 22 to exhaust slowly. The pressure exerted on punching surface 30 forces the punch back within the channel 21 and below the surface of drum 10.

The time required for the punch to be returned to its retracted position is dependent upon the speed of rotation of the punch drum. That is, for higher rotational speeds, the rate of retraction is less for a given fluid pressure acting against the punching surface 30. The embodiment of FIGURE 1 is well suited for slower speeds of operation with an attendant reduction in punched card output. However, if a greater punched card output is required the punch drum must rotate at greater speeds and some faster acting means must be provided for retracting the punch.

Figure 2:
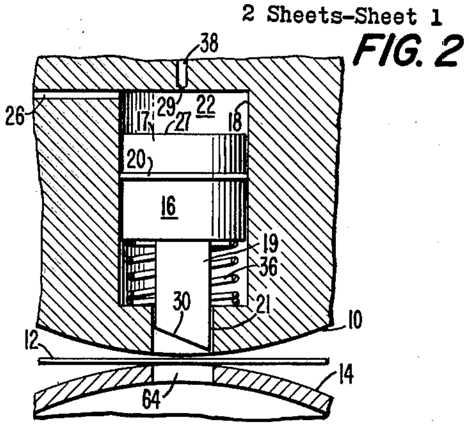
FIGURE 2 is a second embodiment of a free moving fluid-actuated punch in accordance with the present invention.

FIGURE 2 illustrates a second embodiment of the present invention wherein the punch is retracted at a faster rate in response to a positive force exerted by a spring. The punch of FIGURE 2 is extended through the card 12 in the same manner as in the embodiment of FIGURE 1. That is, control signal is applied over a first control duct 26 to the confined space 22 and acts against the surface 27 to extend the punch outward through the card. As the punch moves outward it compresses the spring 36 which retracts the punch upon removal of the control signal. The return movement of the punch is cushioned by the fluid confined within the space 22 but which is free to exhaust through the restricted orifice 29 and duct 38.

Figure 3:
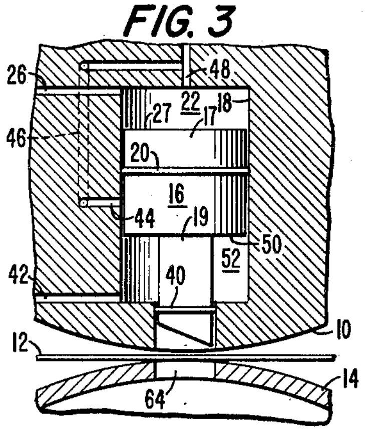
FIGURE 3 is a third embodiment of a free moving fluid-actuated punch in accordance with the present invention.

The embodiment of FIGURE 3 is also suitable for use in card punching systems wherein the punch drum 10 must rotate at high speeds in order to produce a large punched card output. FIGURE 3 shows a double acting piston-punch 16 reciprocating within a cylinder 18. A fluid seal 20 surrounds the upper portion 17 of the punch body and prevent leakage of fluid from the enclosed space 22 to the enclosed space 52. A second fluid seal 40 prevents leakage of fluid from the enclosed space 52 outward into the working environment of the system. Control signals in the form of increased fluid pressures are applied over first control duct 26 to the enclosed space 22 and over second control duct 42 to the enclosed space 52. Exhaust duct 44 connects with the enclosed space 52 and exhaust duct 48 connects with the enclosed space 22. Duct 46 forms a connecting passageway between the duct 44 and the duct 48. Duct 48 offers a moderately low resistance to fluid flow and is connected by suitable means to the low pressure side of the system.

The embodiment of FIGURE 3 operates as follows. A control signal in the form of increased fluid pressure is applied over the first control duct 26 to the enclosed space 22 and acts against the surface 27 to drive the punch downward through the card 12. The signal applied to the first control duct is then removed and a signal is applied over the second control duct to the enclosed annular space 52. This pressure acts upon the surface 50 and drives the punch upward towards its retracted position. The signal on duct 42 is then terminated but the punch is forced upward because of the fluid confined within space 52. The upward travel of the punch is cushioned by the fluid confined within the space 22 but which is exhausting through the duct 48. As the punch travels upward it uncovers the duct 44 thus permitting the fluid in the confined space 52 to escape by way of ducts 46 and 48 to the low pressure side of the fluid supply system. This equalizes the pressures against surfaces 27 and 50 so the force acting downward against the punch is equal to the force acting upwardly against it. It is obvious that because of the quick positive retraction of the punch, the punch and die rollers can rotate at higher speeds thus producing larger punched card outputs.

Figure 4:
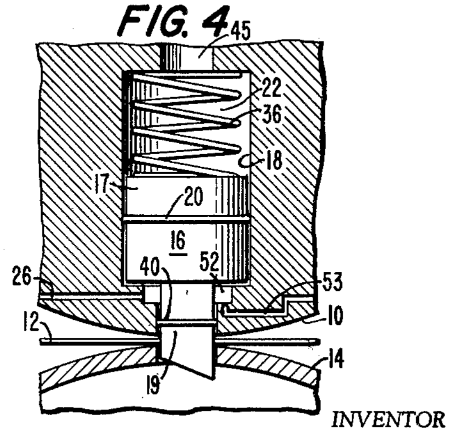
FIGURE 4 is a fourth embodiment of a free moving fluid-actuated punch in accordance with the present invention.

FIGURE 4 shows still another punch arrangement according to the present invention, the operation of this arrangement being the reverse of that shown in FIGURE 2. That is, in this embodiment, the spring 36 normally holds the punch 16 in an extended position with the punching surface 30 extending outside the periphery of the punch drum 10. The spring is of sufficient stiffness to force the punch through the card as the punch drum rotates. In order to prevent punching, fluid pressure is applied over control duct 26, this pressure being great enough to overcome the force exerted on the punch by the spring. The fluid pressure is applied to the confined space 52 before the punch drum advances to the punching position so that the punch may be retracted before the time it would normally penetrate the card. Fluid in the space 22 is exhausted through opening 45 as the punch is rotated. The fluid pressure is applied over duct 26 until the drum rotates past the punching position after which the fluid pressure is removed. The force of the spring then returns the punch to its extended position. The return stroke is cushioned by the fluid trapped within the confined space 52 but which is exhausted through the constricted orifice into duct 53. The duct 53 is connected to the low pressure side of the fluid supply. Thus, this embodiment of the invention provides a means for selectively retracting the punch to prevent punching as opposed to the embodiments of FIGURES 1 through 3 wherein the punches are selectively extended to cause punching.

Figure 6:
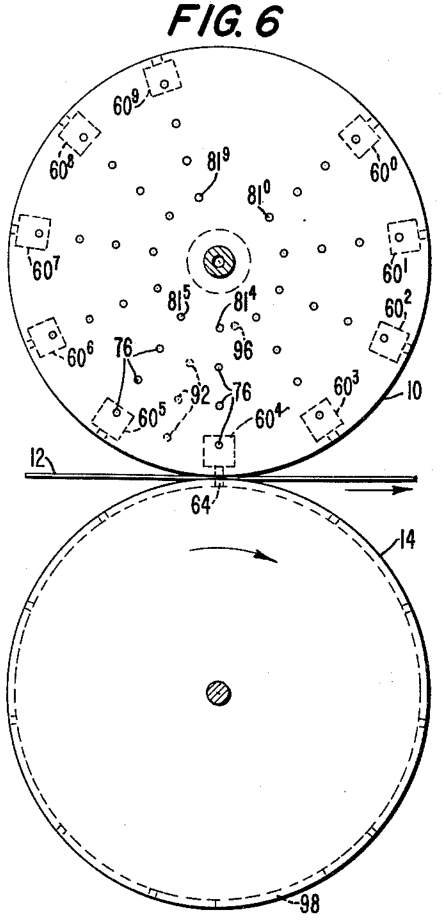
FIGURE 6 is an end view of the punch drum and die drum.
Figures 5, 7:
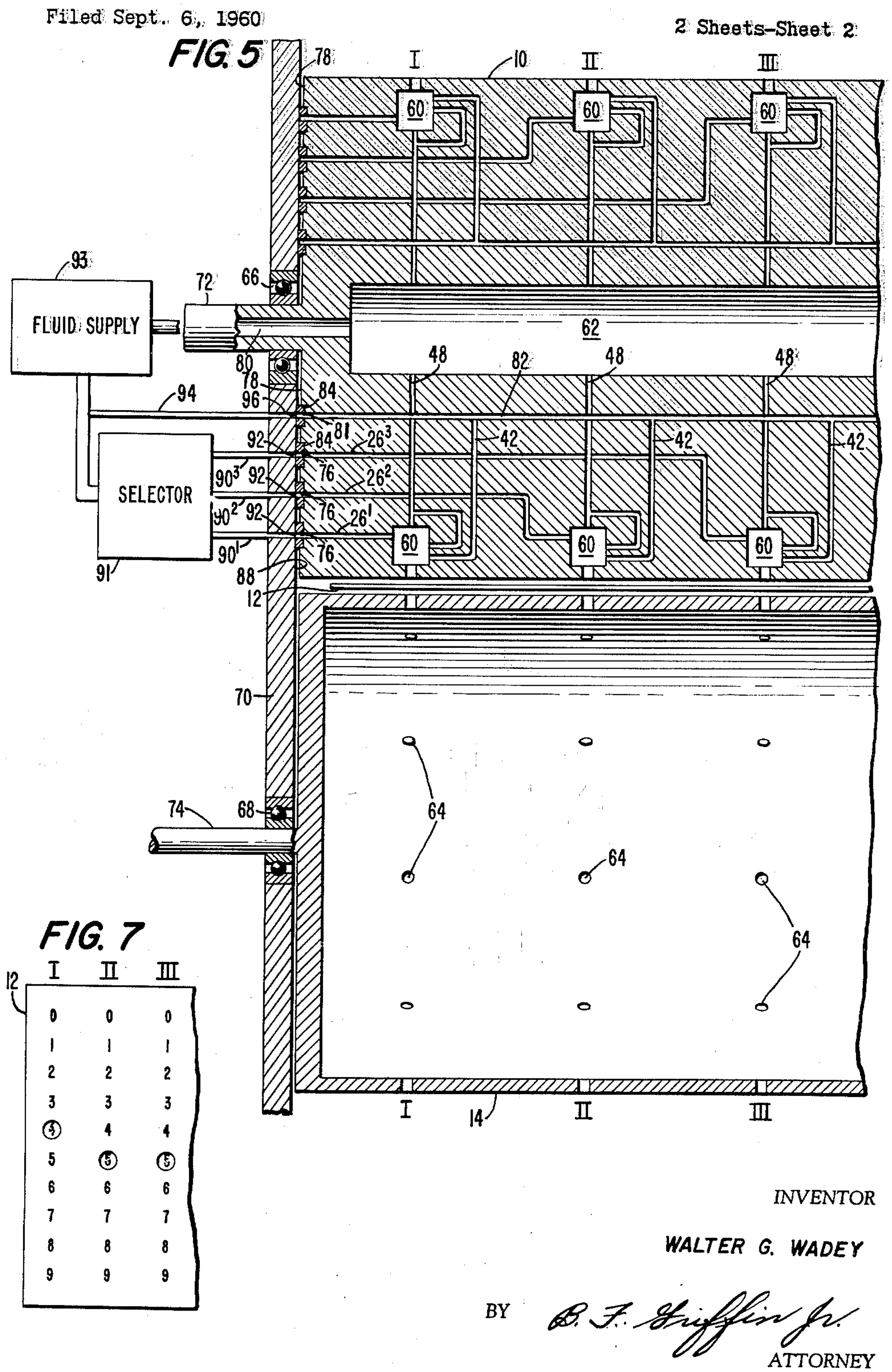
FIGURE 5 is a sectional view of the punch and die drums.
FIGURE 7 shows a card which may be utilized with the present invention.

FIGURE 5 is a sectional view of the punch and die drums according to the present invention. The punch drum 10 comprises a substantially solid body surrounding a hollow core 62. A plurality of punches 60 of the type shown in FIGURE 3 are contained within the solid portion of the drum. The punches are arranged in a plurality of rows extending longitudinally along the drum. The number of rows of punches depends upon the coding system employed. As shown in FIGURE 6, the illustrated system is designed to represent numbers in the decimal system, and has ten rows of punches for punching holes representing the decimal values 0 through 9. The punches are also arranged in columns around the periphery of the drum so that one punch of each row will lie in the same column as the corresponding punch of each of the other rows. For purposes of illustration only three columns I, II, III, have been shown (FIG. 5), but it is obvious to those skilled in the art that the number of columns is determined only by the number of characters to be punched in the card.

The die drum 14 comprises an outer shell surrounding a hollow interior. The outer shell contains a plurality of holes 64, one for each of the punches 60. The punch and die drums are axially aligned and rotate in synchronism so that successive holes 64 will be aligned with and capable of receiving successive punches 60 if the punches are extended through the card 12.

Bearings 66 and 68 mounted in stationary side plate 70 permits the punch and die drums to be continuously driven by means of shafts 72 and 74 from any suitable drive means.

Each of the control signal ducts 26 terminates at a port or opening 76 in the end surface 78 of the punch drum. Thus, for the embodiment being described, there are 10 groups of ports 76, each group containing 3 ports. There is one group for each of the 10 possible horizontal rows and 3 ports in each group, one port for each vertical card column. Each of the exhaust ducts 48 is connected to the hollow interior of the drum which is in turn connected through the passageway 80 to the low pressure side of the fluid supply. The control ducts 42 for each row of punches are connected to a common duct 82 which terminates in a port 81 in the surface 78. Reference to FIGURE 6 shows that there are 10 ports 81, one for each of the horizontal rows. Each of the ports 76 and 81 is provided with a fluid seal 84 to prevent leakage of fluid from the system. A plurality of control signal input ducts $\mathbf{90^1}$, $\mathbf{90^2}$ and $\mathbf{90^3}$ pass through the stationary side plate 70 and terminate at ports 92 in the surface 88. Each port 92 is positioned in the stationary side plate so that it will be aligned with successive ports 76 as the punch drum rotates. FIGURE 6 shows these ports superimposed on an end view of punch drum 10. The control signal input ducts $\mathbf{90^N}$ are connected through a selective control device 91 to the high pressure side of the fluid supply 93. The selective control device may, for example, be one of the many types of pneumatic card sensing devices well known in the art. A single control line 94 passes through the stationary side frame and terminates at port 96 in the surface 88. Port 96 is positioned so that it will be aligned with successive ports 81 as the drum rotates.

A better understanding of the present invention may be had by considering FIGURES 5 through 7 in connection with a specific example. Assume that it is desired to punch the value 455 into columns I, II, and III of card 12. The card cycle begins slightly before the punches $\mathbf{60^0}$ arrive at the punching location and continues until slightly after the punches $\mathbf{60^9}$ pass the punching location. The interval between nine punch time and zero punch time corresponds to the intercard spacing.

In the specific example under consideration, nothing of consequence happens until slightly before the punches $\mathbf{60^4}$ arrive at the punching location. At this time, the ports 76 associated with the punches $\mathbf{60^4}$ are aligned with the ports 92 and a control signal applied over duct $\mathbf{90^1}$ passes through duct $\mathbf{26^1}$ to extend the punch $\mathbf{60^4}$ for column one. The punch and die drums then rotate to the position shown in FIGURE 6 at which time the selected punch has passed through the card 12 and into the hole 64. The drums then rotate until the port $\mathbf{81^4}$ associated with $\mathbf{60^4}$ of column I is aligned with port 96. At this time a control signal is applied over duct 94 to the common duct 82 from whence it passes to the control duct 42 of the number four punch associated with column one. This signal causes retraction of the punch in the manner described with reference to FIGURE 3.

Slightly before five punching time, the holes 76 associated with the number five punches becames aligned with the ports 92 and pressure signals are applied over ducts $\mathbf{90^2}$ and $\mathbf{90^3}$ to the control inputs $\mathbf{26^2}$ and $\mathbf{26^3}$ of the punches $\mathbf{60^5}$ associated with columns II and III. These punches begin to move outward and by the time the five-punches reach the punching position they are fully extended and have pierced the card 12. Slightly after five time, another control signal is applied to duct 94 from whence it passes through the duct 82 to the ducts 42 of all the punches $\mathbf{60^5}$. This signal retracts the punches $\mathbf{60^5}$ associated with columns two and three. Nothing of consequence happens during the remainder of the punch cycle. The result of this operation is seen in FIGURE 7 wherein the card 12 is illustrated as having a hole punched at the four position in column one and at the five position in both columns two and three.

Although FIGURES 5 and 6 have been described as utilizing a double acting punch such as that shown in FIGURE 3, it will be obvious to one skilled in the art that punches such as those shown in FIGURES 1 and 2 may be utilized. In this event, it is not necessary to provide the control input duct 94, connecting ducts 82, control ducts 42, or exhaust ducts 46.

Thus far, no mention has been made as to how the chips punched from the card are removed from the interior of the die drum. In the situation where the die drum is mounted below the punch drum, this is easily accomplished by providing a longitudinal slot 98 (FIGURE 6) in the periphery of the die drum surface. Chips may collect within the interior of the die drum and fall out through the slot 98 into a chip collector as the die drum rotates. If for any reason it should be desirable to place the die drum above the punch drum, the chips may be removed by a vacuum system which communicates with the interior of the die drum through a passageway in shaft 74.

While the novel features of the invention as applied to preferred embodiments have been shown and described, it will be understood that various omissions and substitutions in the form and detail of the devices illustrated may be made by those skilled in the art without departing from the spirit of the invention.

For example, the record medium may be fed endwise so that punching takes place one character or column at a time as opposed to the embodiment shown wherein punching takes place on a row by row basis. This arrangement is particularly suitable for the punching of long tapes. Alternatively, the binary, coded binary, Hollerith, Morse or other system of representation may be used in combination with continuous or intermittent rotation of the punch and die drums without departing from the spirit and scope of the present invention. It is intended therefore to be limited only by the scope of the appended claims.

I claim:

1. A punching device comprising a rotatable punch drum having punch means therein, means for extending said punch means beyond the periphery of said punch drum, a rotatable die drum having means therein for receiving said extended punch means, and means for retracting said punch means within said punch drum, said extended position being the rest position of said punch means and said means for retracting comprising means for selectively applying fluid signals to said punch means to prevent punching.

2. A selective punching device comprising: a rotatable punch drum having a plurality of punches disposed therein; means for applying fluid pressure to selected ones of said punches to extend said punches into punching position beyond the surface of said punch drum; and a rotatable die drum having a plurality of holes therein for receiving said extended punches.

3. A selective punching device comprising: a rotatable punch drum having a plurality of cylinders disposed therein; a punch disposed within each of said cylinders, said punches having a punching surface on one end thereof; means for applying fluid pressure to selected ones of said cylinders to drive the punches therein to their punching positions whereat their work surfaces extend beyond the surface of said punch drum; a die drum having holes therein for receiving said extended punching surfaces; and means for retracting said punches to a position whereat said punching surfaces do not extend beyond the surface of said punch drum.

4. A selective punching device as claimed in claim 3 wherein said retracting means is fluid pressure acting against said punching surfaces, and means for reducing the fluid pressure within said cylinders.

5. A selective punching device as claimed in claim 3 wherein said retracting means comprises springs compressed by said punches as said punches are extended.

6. A selective punching device as claimed in claim 3 wherein said retracting means comprises further means for applying fluid pressure signals to said cylinders.

7. A record punching device comprising: a rotatable punch drum; a plurality of chambers, each having a reciprocable punch piston therein, said piston and chambers being within said punch drum and arranged in rows along the length thereof and also arranged in columns around the periphery thereof whereby said punches are presented at a punching position adjacent said record row to row as said punch drum rotates; a rotatable die drum disposed adjacent said punch drum, said die drum having a plurality of holes arranged in a corresponding pattern of rows and columns; means for selectively generating fluid signals; a first plurality of ducts selectively connected to said source of fluid signals for applying fluid pressure to selected ones of said chambers in each row as each row approaches said punching position to thereby extend selected ones of said punches through said record and into said holes; and means to retract said extended punches as said rows move away from said punching position.

8. A card punching device as claimed in claim 7 wherein said first plurality of fluid ducts are within said punch drum and terminate at ports in the surface thereof, and said means for selectively extending said punches also comprises a second plurality of fluid ducts, connected to said means for generating fluid signals, and positioned adjacent said punch drum surface for applying fluid pressure signals to said first plurality of ducts through said ports.

9. A card punching device as claimed in claim 8 wherein said second plurality contains N ducts, N being the number of punches in each row within said punch drum, said second plurality of ducts selectively applying said fluid pressure signals to N of said ports at a time as said ports move adjacent said second plurality of ducts, N being a number greater than zero and less than infinity.

10. A fluid actuated punch comprising a cylinder within a solid body, a channel extending from said cylinder to the surface of said solid body; a punch within said cylinder, said punch having an elongated portion shaped to provide a punching surface, said punching surface normally resting within said channel below the surface of said solid body; means to apply fluid pressure to said punch to extend said punching surface above the surface of said solid body, and means for applying fluid pressure to said punch to retract said punching surface below the surface of said solid body.

11. A fluid actuated punch as claimed in claim 10 and further comprising cushioning means for decelerating said punch as it is retracted, said cushioning means comprising fluid compressed within said cylinder as said punch is retracted.

12. A fluid actuated punch comprising a cylinder within a solid body, a channel extending from said cylinder to the surface of said solid body, a punch within said cylinder, said punch having an elongated portion shaped to provide a punching surface, said punching surface being normally positioned at a point on the exterior of said solid body; means for selectively applying fluid pressure to said punch to retract said punching surface into said channel; and means for returning said punching surface to its normal position.

13. A punch device comprising: a rotatable drum; a chamber within said drum; a piston, said piston being within said chamber and adapted to reciprocate therein in response to forces applied to first and second surfaces thereof; a channel connected to said chamber and the surface of said drum; a punch connected to said piston and extending into said channel; first fluid conducting means for applying force to said first surface by creating fluid pressure between the walls of chamber and said first surface to thereby drive said punch beyond the surface of said drum; second fluid conducting means for applying force to said second surface by creating fluid pressure between the walls of said chamber and said second surface to thereby retract said punch into said channel; means including fluid conducting means terminating at ports in said chamber for equalizing the forces on said first and second surfaces after said punch has been retracted into said channel; and a die drum having at least one hole therein for receiving said punch.

14. A punch device comprising: a rotatable punch drum having a chamber therein; a channel extending from said chamber to the surface of said drum; a punch comprising a piston having an elongated member extending from one end thereof, said elongated member extending into said channel and having a punching surface thereon; said piston having two surfaces within said chamber to which forces may be applied to thereby reciprocate said piston; a first fluid duct connected to said chamber for applying fluid force to one surface of said piston to thereby drive said punching surface beyond the surface of said drum; a second fluid duct connected to said chamber for applying fluid force to the other surface of said piston to thereby retract said punching surface into said channel; and a rotatable die drum for receiving said punching surface when it is driven beyond the surface of said punch drum.

15. A punch device comprising: a rotatable punch drum having a chamber therein; a channel extending from said chamber to the surface of said drum; a punch comprising a piston having an elongated member extending from one end thereof, said elongated member extending into said channel and having a punching surface thereon; said piston having two surfaces within said chamber to which forces may be applied to thereby reciprocate said piston; a first fluid duct connected to said chamber for applying fluid force to one surface of said piston to thereby drive said punching surface beyond the surface of said drum; a compression spring for applying force to the other surface of said piston to thereby retract said punching surface into said channel when fluid force is not applied to said one surface of said piston; and a rotatable die drum for receiving said punching surface when it is driven beyond the surface of said punch drum.

16. A punch device comprising: a rotatable punch drum having a chamber therein; a channel extending from said chamber to the surface of said drum; a punch comprising a piston having an elongated member extending from one end thereof, said elongated member extending into said channel and having a punching surface thereon; said piston having two surfaces within said chamber to which forces may be applied to thereby reciprocate said piston; a fluid duct connected to said chamber for applying fluid force to one surface of said piston; means for applying a force to the other surface of said piston; and a rotatable die drum having at least one hole therein for receiving said punching surface.

17. A record punching device comprising: a rotatable punch drum having a plurality of punch means therein, each of said punch means comprising a chamber, a piston within said chamber, said piston having first and second surfaces within said chamber to which forces may be selectively applied to reciprocate said piston within said chamber, a channel connecting said chamber to the surface of said drum, said piston having a portion thereof forming a punch face extending into said channel; a plurality of fluid ducts terminating at one end at ports in the surface of said drum and terminating at the other end as ports in said chambers; means for selectively producing a plurality of fluid signals indicating holes to be punched in said record; means for applying said signals to said fluid ducts through the ports in the surface of said drum as said drum rotates to thereby apply fluid force to selected ones of said first surfaces of said pistons whereby selected ones of said punch faces are extended beyond the surface of said punch drum; a rotatable die drum having holes therein for receiving punch faces extended beyond the surface of said punch drum; and means operative upon termination of said signals for retracting said punch faces into said channels by applying a force to said second piston faces.

18. A record punching device as claimed in claim 17 wherein said punch face retracting means comprises fluid conducting means connected to said fluid chambers and terminating at further ports in said punch drum surface; and means for applying fluid to said further ports at timed intervals determined by the speed of rotation of said punch drum.

19. A record punching device as claimed in claim 17 wherein said punch face retracting means comprises a compression spring in each of said chambers, said compression springs being positioned between said second surfaces of said pistons and a wall of said chamber whereby said springs are compressed if a fluid force is exerted on the first surface of the corresponding piston.

References Cited in the file of this patent

UNITED STATES PATENTS

| | | |
|---|---|---|
| 2,438,673 | McMahan | Mar. 30, 1948 |
| 2,761,509 | Marshall et al. | Sept. 4, 1956 |
| 2,956,740 | McGregor | Oct. 18, 1960 |

UNITED STATES PATENT OFFICE

CERTIFICATE OF CORRECTION

Patent No. 3,059,842 October 23, 1962

Walter G. Wadey

It is hereby certified that error appears in the above numbered patent requiring correction and that the said Letters Patent should read as corrected below.

Column 3, line 54, for "prevent" read -- prevents --; column 4, line 33, for "rotated" read -- retracted --; column 8, line 59, after "chamber" strike out the comma.

Signed and sealed this 21st day of April 1964.

(SEAL)

Attest:

ERNEST W. SWIDER

Attesting Officer

EDWARD J. BRENNER

Commissioner of Patents